Patented June 27, 1933

1,915,745

UNITED STATES PATENT OFFICE

KURT MEISENBURG, OF LEVERKUSEN, AND WALTER BOCK, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RUBBER LIKE MASSES CONTAINING OLEFINE NAPHTHALENE POLYMERIZATES

No Drawing. Application filed July 10, 1930, Serial No. 467,125, and in Germany April 25, 1930.

The present invention relates to a process of manufacturing mixed rubber like masses, to a process of vulcanizing these masses and to the vulcanizates obtainable by said vulcanizing process.

The process of manufacture of the mixed rubber like masses is effected by causing complete interpenetration of the polymerization product of a butadiene hydrocarbon, more particularly of a hydrocarbon of the probable formula

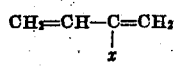

15 wherein $x$ means hydrogen or methyl, with a polymerization product of an olefine naphthalene, such as alpha-vinylnaphthalene, homologues thereof, polyvinylnaphthalenes and the like. The incorporating and effecting of complete interpenetration of the butadiene hydrocarbon- and olefine naphthalene polymerizate is best performed by mixing the different hydrocarbons and causing polymerization of the mixture either by simple heating, for example, to about 40-80° C., or in emulsion with water and an emulsifying agent or an emulsoid colloid, preferably while gently heating the emulsion to about 30-70° C. while shaking or stirring the mixture. It will be likewise possible to intimately mix incompletely polymerized butadiene hydrocarbons with incompletely polymerized olefine naphthalenes, which polymerized products should still possess a somewhat viscous character, by mechanical means and causing further polymerization of the mixtures thus obtained according to one of the processes above mentioned with or without the addition of further butadiene hydrocarbon and/or olefine naphthalene hydrocarbon. Obviously our mixed rubberlike masses can also be obtained by at first partially polymerizing a butadiene hydrocarbon, then adding an olefine naphthalene hydrocarbon and further polymerizing according to one of the methods described above or vice versa.

It may be mentioned that in the claims the expression "effecting complete interpenetration" of a heat or emulsion polymerizate derived from a compound of the probable formula

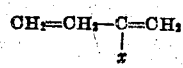

55 wherein $x$ stands for hydrogen or methyl, with a heat or emulsion polymerizate of an olefine naphthalene, is intended to include all the modifications defined above. Obviously also such processes are within the scope of this expression, in which ingredients known to favorably influence the polymerization processes in question, such as oxygen, substances splitting off oxygen, metal oxides, electrolytes and the like are employed.

It may further be mentioned that rubber-like masses should not be prepared by mechanically mixing a completely polymerized butadiene hydrocarbon and a completely polymerized olefine naphthalene hydrocarbon since bad results are obtained in this case.

The different hydrocarbons or the incompletely polymerized products should be employed in such amounts that the mixed completed rubber-like masses contain below about 45% by weight of the olefine naphthalene polymerizate. The best results generally are obtained when employing the olefine naphthalene in such an amount that the mixed rubber-like masses contain between about 15-40% by weight of the olefine naphthalene polymerizate.

Instead of the pure butadiene hydrocarbons or pure olefine naphthalenes the cheaper technical raw products or mixtures of butadiene with isoprene and/or mixtures of different olefine naphthalenes or the incompletely polymerized product of the said hydrocarbons may be employed in many cases with good results.

It will also be advantageous in some cases to add before or during polymerization rather small amounts of other diolefine hydrocarbons, such as 2.3-dimethyl-butadiene, phenyl-butadiene or the like, by which additions the character of the final products can be somewhat altered.

The mixed polymerizates thus obtainable are good plastics and easily workable on rollers and yield vulcanizates of high technical value, especially when vulcanized after the addition of a suitable soot variety.

It may be mentioned that the use of olefine naphthalenes as compared with the use of olefine benzenes as described in a co-pending application Ser. No. 467,126 of even date has the advantage that the mixed polymerizates containing olefine naphthalenes are obtained in a better yield than those containing olefine benzenes and that they are still more plastic and more easily workable on rollers. Olefine benzenes and olefine naphthalenes therefore are not to be considered as equivalents in polymerization processes.

It may further be mentioned that vulcanization products obtainable from the mixed rubber-like masses described above are generally superior in view of their mechanical properties to the vulcanizates obtainable from the corresponding butadiene or isoprene polymerizate not containing an olefine naphthalene polymerizate. This is surprising inasmuch as the olefine naphthalene polymerizates possess a hard resin like character and, furthermore, in view of the fact that an advantageous change in mechanical properties due to the presence of an olefine naphthalene polymerizate cannot be observed if instead of a heat or emulsion polymerizate of butadiene or isoprene a sodium polymerizate of the same hydrocarbons is employed.

As mentioned above our new mixed polymerizates are very plastic and easily workable on rollers in consequence of which fact they very easily take up fillers, such as soot, colloidal silicic acid, aluminium oxide, zinc oxide and the like, vulcanizing agents, such as sulfur, selenium, etc., vulcanization accelerators, plasticizing agents, dyestuffs and other ingredients usually applied in vulcanization processes.

By vulcanizing mixtures of our new mixed polymerizates after having incorporated therewith about 20–70% their weight of a suitable soot variety, such as carbon black, oil soot and the like, and in addition, sulfur in an amount between about 0.5–5% by weight of the butadiene hydrocarbon olefine naphthalene hydrocarbon polymerizate mixture and further, if desired, other ingredients as defined above, vulcanizates are obtainable which generally will possess a tensile strength between about 180–350 kg/sqcm at a stretch between about 500–800%.

The vulcanization process may be performed by heating the vulcanization mixture to a suitable temperature, for example, to a temperature between about 100–150° C., the time of vulcanization obviously being dependent on the type of vulcanization accelerator used.

The following examples illustrate our invention, without limiting it thereto; the parts being by volume:—

*Example 1.*—65 parts of butadiene-1:3, 10 parts of alpha-vinylnaphthalene, 100 parts of a 10% aqueous solution of sodium oleate and 3 parts of 1/1 normal caustic soda solution are emulsified in a pressure vessel and polymerized with agitation for five days at 60° C. A cream-like paste is obtained, which can be coagulated by acidification or by cooling; the yield of coagulate obtained amounts to about 90%. On vulcanizing the coagulation product with the addition of lamp black a soft rubber like mass of very high strength and elasticity is obtained.

By employing in the above example 8 parts of 1/1 normal caustic soda solution instead of 3 parts, the yield of the polymerization product is increased by about 3–5%. The mixed rubber-like mass thus obtainable yields a vulcanization product similar to that described in the first part of this example, but possesses a considerably higher elongation.

*Example 2.*—75 parts of butadiene-1:3, 20 parts of alpha-vinylnaphthalene, 100 parts of a 10% aqueous solution of sodium oleate and 3 parts of 1/1 normal caustic soda solution are emulsified and polymerized as described in Example 1. After coagulation of the latex-like mass, a strong plastic polymerization product is obtained in a yield of about 94% and the vulcanization product of the latter, besides possessing high strength and good elasticity, is especially distinguished by a good elongation.

*Example 3.*—68 parts of butadiene-1:3 and 20 parts of vinylnaphthalene are emulsified with 80 parts of a 2% aqueous solution of the hydrochloride of the diethylaminoethoxyanilide of oleic acid and the emulsion is agitated for 4 days at 60° C. A latex-like paste is obtained in a substantially quantitative yield, from which the mixed rubber-like mass can be obtained by coagulation. The mixed rubber-like masses thus obtained may be vulcanized; for example, in the following manner:

Into 100 parts by weight of a mixture of this polymerizate with 50 parts by weight of gas-black are rolled in 15 parts by weight of zinc-oxide, 4 parts by weight of a mixture obtained by melting together equal parts of wool tar and colophony, 2 parts by weight of stearic acid, 15 parts by weight of sulfur and 1.8 parts by weight of a vulcanization accelerator, the mixture is vulcanized in the usual manner. A soft rubber-like product of a good elongation is thus obtained, possessing a tensile strength of 250–260 kg/sqcm at an extensibility of 500–600% and an elasticity of 47–50%.

We claim:—

1. The process which comprises incorporating within a mixed rubber-like mass obtained by effecting complete interpenetration of a heat or emulsion polymerizate derived from a compound of the probable formula:—

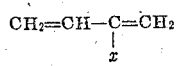

wherein $x$ means hydrogen or methyl, with a heat or emulsion polymerizate derived from a vinyl naphthalene hydrocarbon in such a manner that the mixed polymerizate contains below about 45% by weight of the vinyl naphthalene hydrocarbon polymerizate, a vulcanizing agent and a finely divided soot variety in an amount between about 20% and about 70% by weight of the mixed rubber-like mass employed, and vulcanizing the mixture.

2. The process which comprises incorporating within a mixed rubber-like mass obtained by effecting complete interpenetration of a heat or emulsion polymerizate derived from a compound of the probable formula:—

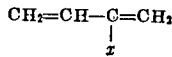

wherein $x$ stands for hydrogen or methyl, with a heat or emulsion polymerizate derived from a vinyl naphthalene hydrocarbon in such a manner that the mixed polymerizate contains below about 45% by weight of the vinyl naphthalene polymerizate, sulfur in an amount between about 0.5 and about 5% by weight of the mixed polymerizate employed and carbon black in an amount between about 20 and about 70% by weight of the mixed polymerizate employed, and vulcanizing the mixture.

3. The process which comprises incorporating within a mixed rubber-like mass obtained by effecting complete interpenetration of a heat or emulsion polymerizate derived from a compound of the probable formula:—

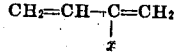

wherein $x$ stands for hydrogen or methyl, with a heat or emulsion polymerizate derived from a vinyl naphthalene hydrocarbon in such a manner that the mixed polymerizate contains between about 15 and about 40% by weight of the vinyl naphthalene polymerizate, sulfur in an amount between about 0.5 and about 5% by weight of the mixed polymerizate employed and carbon black in an amount between about 20 and about 70% by weight of the mixed polymerizate employed and vulcanizing the mixture.

4. The process which comprises incorporating within a mixed rubber-like mass obtained by effecting complete interpenetration of a heat or emulsion polymerizate derived from a compound of the probable formula:—

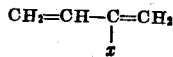

wherein $x$ means hydrogen or methyl, with a heat or emulsion polymerizate derived from alpha-vinyl naphthalene, in such a manner that the mixed polymerizate contains below about 45% by weight of the alpha-vinyl naphthalene polymerizate, sulfur in an amount between about 0.5 and about 5% by weight of the mixed polymerizate employed and carbon black in an amount between about 20 and about 70% by weight of the mixed polymerizate employed and vulcanizing the mixture.

5. The process which comprises incorporating within a mixed rubber-like mass obtained by effecting complete interpenetration of a heat or emulsion polymerizate derived from a compound of the probable formula:—

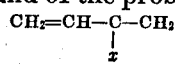

wherein $x$ stands for hydrogen or methyl, with a heat or emulsion polymerizate derived from alpha-vinyl naphthalene in such a manner that the mixed polymerizate contains between about 15 and about 40% by weight of the alpha-vinyl-napthalene polymerizate, sulfur in an amount between about 0.5 and about 5% by weight of the mixed polymerizate employed and carbon black in an amount between about 20 and about 70% by weight of the mixed polymerizate employed, and vulcanizing the mixture.

6. The vulcanizates being obtainable in accordance with the process or claim 1, said vulcanizates possessing high grade technical properties approaching or, in many cases, even surmounting those of natural rubber polymerizates.

7. The new vulcanizates being obtainable in accordance with the process of claim 2, said vulcanizates generally possessing a tensile strength between about 180–350 kg/sqcm at a stretch between about 500–800%.

8. The new vulcanizates being obtainable in accordance with the process of claim 3, said vulcanizates generally possessing a tensile strength between about 180–350 kg/sqcm at a stretch between about 500–800%.

9. The new vulcanizates being obtainable in accordance with the process of claim 4, said vulcanizates generally possessing a tensile strength between about 180–350 kg/sqcm at a stretch between about 500–800%.

10. The new vulcanizates being obtainable in accordance with the process of claim 5, said vulcanizates generally possessing a tensile strength between about 180–350 kg/sqcm at a stretch between about 500–800%.

In testimony whereof, we affix our signatures.

KURT MEISENBURG.
WALTER BOCK.